Sept. 21, 1926.

N. G. CEDILLO 1,600,317

TRANSMISSION MECHANISM

Filed April 27, 1923　　3 Sheets-Sheet 1

Sept. 21, 1926.　　　　　　　　　　　　　　1,600,317
N. G. CEDILLO
TRANSMISSION MECHANISM
Filed April 27, 1923　　3 Sheets-Sheet 2

Nick. G. Cedillo, Inventor

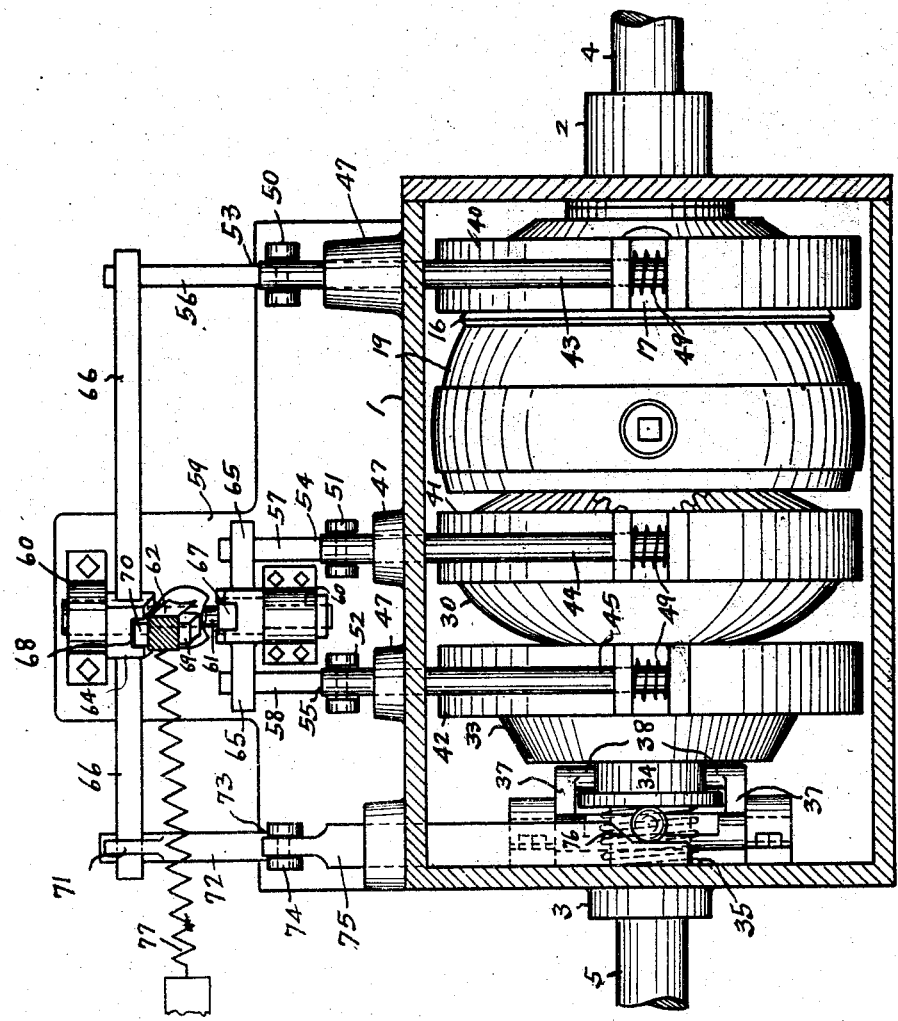

Patented Sept. 21, 1926.

1,600,317

UNITED STATES PATENT OFFICE.

NICK G. CEDILLO, OF HOUSTON, TEXAS.

TRANSMISSION MECHANISM.

Application filed April 27, 1923. Serial No. 635,095.

This invention relates to new and useful improvements in a transmission mechanism.

One object of the invention is to provide a transmission mechanism through which power may be delivered from a driving to a driven shaft at variable rates of speed and without shifting the connecting gears, thus avoiding the clashing of gears and the injury thereof incident to shifting the same.

Another object of the invention is to provide a transmission mechanism which is very simple in construction, which may be cheaply manufactured and which will not readily get out of repair.

With the above and other objects in view the invention has particular relation to certain novel features of construction, operation and arrangement of parts, an example of which is given in this specification and illustrated in the accompanying drawings, wherein:—

Figure 3 is a plan view showing the transmission case in section.

Figure 1:
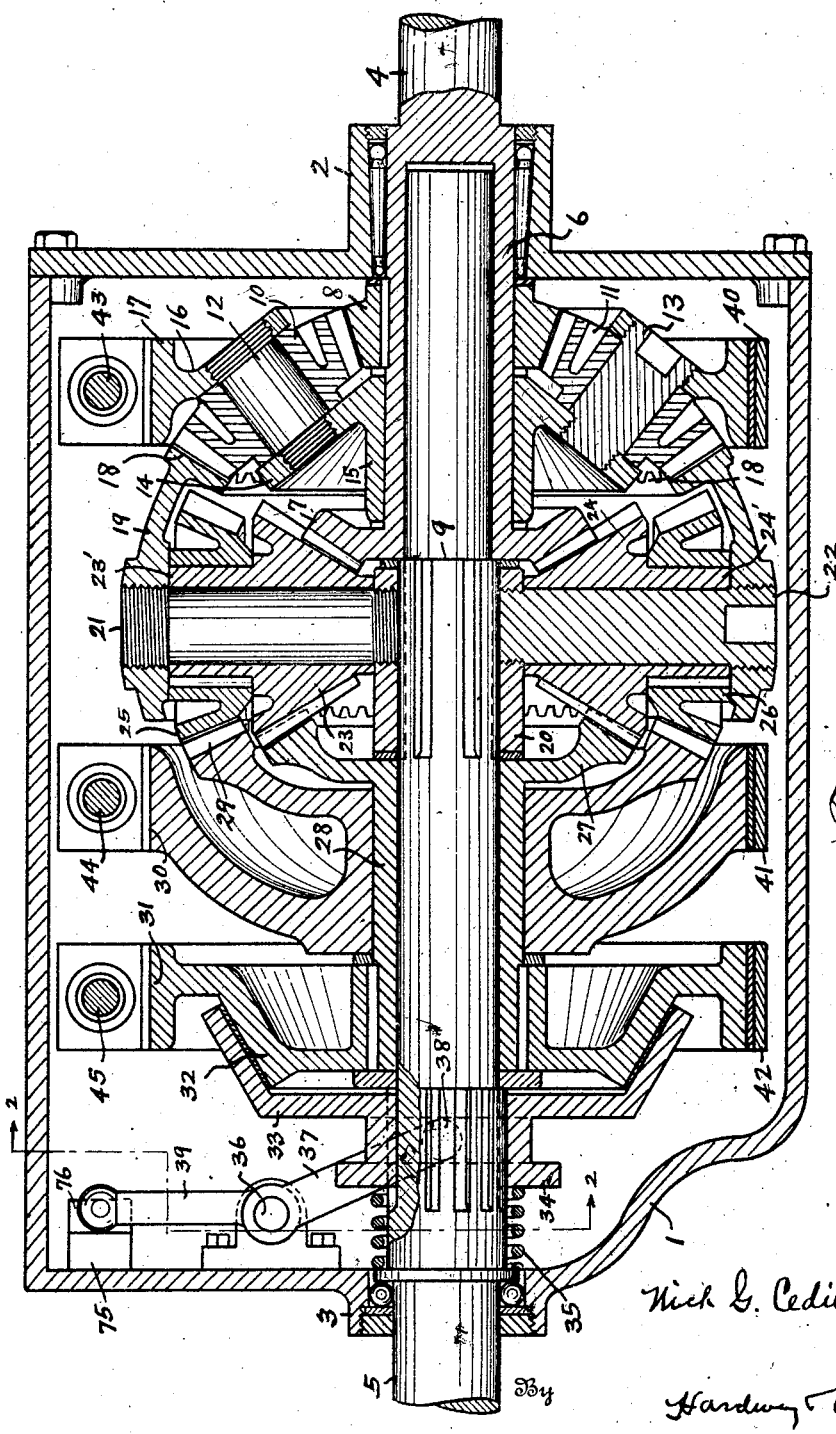
Figure 1 is a longitudinal sectional view of the transmission.
Figure 2:
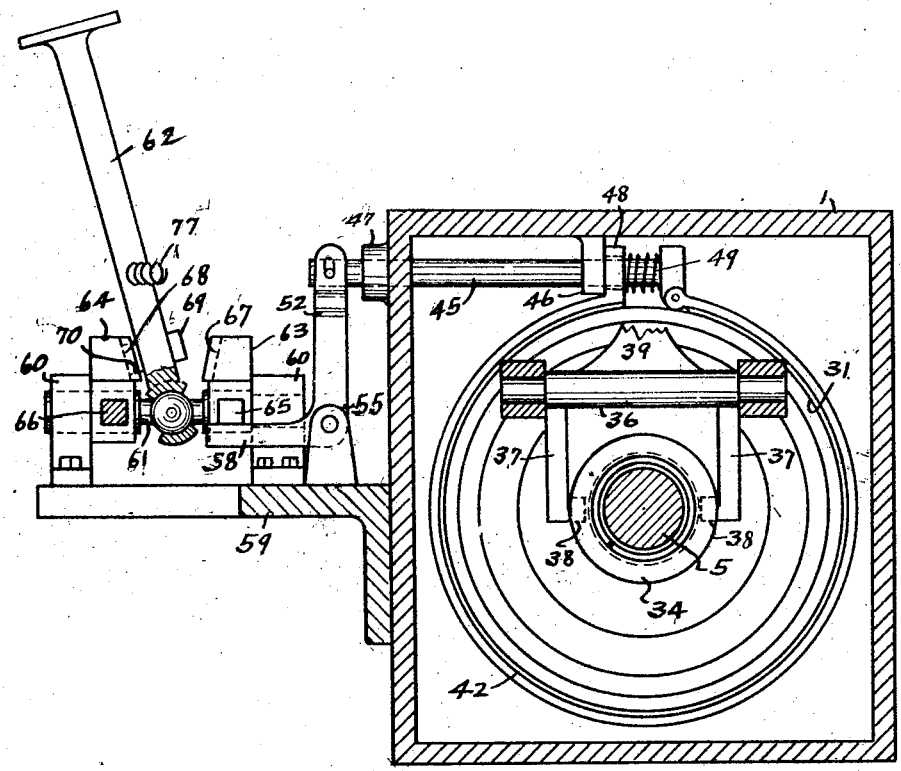
Figure 2 is a transverse sectional view taken on the line 2—2 of Figure 1.

In the drawings the numeral 1 designates a transmission case. This case has the end bearings 2 and 3 in which the driving and driven shafts 4 and 5, respectively, rotate. The inner end of the driving shaft is formed into a sleeve 6 which has a driving pinion 7 formed integrally therewith, and a driving pinion 8 splined on it. The driven shaft has its inner end extended into said sleeve 6 which forms a bearing therefor, said end projecting into said sleeve being reduced forming the annular bearing shoulder 9 against which the inner end of the sleeve 6 abuts. The pinion 8 is in mesh with the upper and lower reverse gears 10 and 11 which are rotatably mounted on the bearing pins 12 and 13. The inner ends of these pins 12 and 13 are anchored to the conical shaped web 14 which has a bearing 15 on the sleeve 6, and the outer ends of said pins are anchored to the web 16 which surrounds said reverse gears and which is formed with an annular brake drum 17. The reverse gears 10 and 11 are in mesh with the bevel gear face 18 of the housing ring 19. There is a collar 20 keyed on the driven shaft 5 and there are opposing bearing pins 21 and 22 whose outer ends are anchored to the housing ring 19 and whose inner ends are anchored to said collar 20. Rotatably mounted on these respective pins 21, 22 are the pinions 23, 24 whose inner ends have bearings against the sleeve 20 and whose outer ends are extended forming the sleeves 23′, 24′, and splined upon these sleeves are the pinions 25, 26. Arranged opposite the driving pinion 7 and in mesh with the pinions 23, 24 there is a bevel gear wheel 27 which has an extended sleeve 28 having a bearing on the driven shaft 5. In mesh with the pinions 25 and 26 there is a bevel gear wheel 29 which has a bearing on the sleeve 28 and formed integral with said bevel gear wheel 29 there is a brake drum 30. Splined upon the outer end of the sleeve 28 there is a brake drum 31 which is also formed with a conical shaped clutch member 32. Splined upon the driven shaft 5 there is a corresponding conical shaped clutch member 33 which has the grooved bearing 34 on said driven shaft and interposed between this bearing and the opposing end of the transmission case there is a coil pressure spring 35 which surrounds said driven shaft and which normally holds said clutch members 32 and 33 in engaging position. Pivoted to the adjacent end of the transmission case there is a yoke 36 having the arms 37, 37 with the inwardly turned studs 38, 38 which project into the groove of the bearing 34 and the yoke has an extended arm 39 by means of which the yoke may be manipulated as hereinafter described.

Surrounding the respective drums 17, 30 and 31 are the brake bands 40, 41, and 42. When it is desired to throw the transmission in reverse so as to impart reverse rotation to the driven shaft the brake 40 is set so as to hold the drum 17 against rotation. Rotation will then be imparted through the pinion 8 to the reverse gears 10 and 11 and through them to the annular housing 19, with the gear face 18 of which they are in mesh and said housing 19 will be rotated in the reverse direction and said housing being connected to the driven shaft 5 through the bearing pins 21 and 22, will drive said driven shaft rearwardly or in the direction the reverse of that of the driven shaft 4. During this operation the pinions 23 and 24, and the gearing in operative connection therewith will run idle. When it is desired to shift said transmission mechanism to first speed ahead the brake band 41 is set so as to hold the drum 30 against rotation, and the other brake bands are released. The rotation of the driving shaft 4 will then be imparted through the pinion 7 to the driving pinions 23 and 24, and the driving pinions 25 and 26 which are splined to the sleeves thereof. These last mentioned pinions being in mesh with the bevel gear face 29, and said last mentioned gear face being fixed against rotation, the housing 19 will be forced to rotate forwardly, but at a slower rate of speed than the driving shaft owing to the gear ratio between the pinions 25 and 26 and the gear 29, and said housing being secured to the driven shaft, through the bearing pins 20 and 21, said driven shaft will be forced to rotate therewith. Second speed ahead is accomplished by setting the brake band 42 on the drum 31 and releasing the other brake bands. This will prevent the rotation of the drum 31 and the gear wheel 27 which is keyed thereto through the sleeve 28. The driving pinions 23 and 24 will be rotated, as before, through the pinion 7 and being in mesh with the bevel gear 27 which is held against rotation, said driving pinions 23 and 24 will travel around said gear 27, revolving the bearing pins 21, 22 and the housing 19 with them and rotating the driven shaft 5. The gear ratio, being such that a faster rotation is imparted to the driven shaft 5 than for first speed ahead. Third speed ahead is accomplished by releasing all of the brake bands and releasing the clutch member 33 to the pressure of the spring 35, causing said member to engage with the clutch member 32 which is splined on the sleeve 28. Rotation will then be imparted from the driving shaft 4 through the pinions 7, 23 and 24 and the gear wheel 27 to the driven shaft 5 through said cone clutch the driving and driven members rotating together as a unit. The brake bands are operated through the brake rods 43, 44 and 45, respectively. These rods are connected at one end to one end of the corresponding band and operated through bearings as 46, and 47 in the transmission case 1. The bearings 46 depend from the top of the transmission case and the other end of each brake band is upturned and formed into a bearing 48 through which the corresponding brake rod slides and rests against the corresponding bearing 46, and interposed between the ends of the respective brake bands and surrounding the corresponding brake rod there is a coil push spring 49 which tends to keep the corresponding band in expanded or released position. The other ends of these respective rods 43, 44 and 45 have pivotal connections with the upstanding arms 50, 51 and 52 of the bell cranks 53, 54 and 55, and the other arms 56, 57 and 58 of said bell cranks may be actuated through the mechanism presently to be described.

Fastened to one side of the transmission case there is a ledge or support 59 having the opposing bearings 60, 60 spaced apart in which the shaft 61 is mounted, and a shift lever 62 has the universal joint connection with said shaft. Mounted on said shaft on opposite sides of the lever 62 are the yokes 63 and 64 having the laterally extending arms 65, 65 and 66, 66, and the facing sides of these yokes have the vertical notches 67, and 68 in which the respective lugs 69 and 70, carried by said lever are adapted to engage. The free ends of the arms 65 engage over the respective arms 57 and 58, and the free end of one of the arms 66 engages over the free end of the arm 56, the other arm 66 is fitted through a U-shaped bearing 71 carried by the free end of the arm 72 of the bell crank 73. The other or upstanding arm 74 of said bell crank is pivoted to the outer end of the clutch actuating bar 75 which works between the free end of the yoke arm 39, and the opposing end of the crank case. The outer end of this bar is notched or offset and when the bar is actuated outwardly until said offset portion aligns with the lever 39, said lever is permitted to drop down in said notch and release the spring 35 which thereby operates to engage the clutch member 33 with the clutch member 32. When said actuating bar is forced inwardly the sloping shoulder 76 thereof will contact against the free end of the yoke arm 39 and thereby actuate the yoke to disengage the clutch member 33. The actuation of the bar 75 is accomplished through the lever 62 by engaging the lug 70 in the notch 68. When said lever is actuated toward the left it will operate through the mechanism described to depress the arm 72 and actuate the bar 77 outwardly and permit the clutch member 33 to engage. The driven member will then be rotated at its highest rate of speed and the lever 62 will be held in this position by the pull spring 77, one end of which is attached to said lever, and the other end of which is attached to a fixed anchor. When the lever 62 is in the position indicated all of the brake bands will be held in released position by the springs 49. When it is desired to set the brake 40 the lever 62 may be actuated to the right. This will operate to disengage the clutch member 33 and to depress the arm 56 thereby exerting a pull through the bell crank 53 and the rod 43 and setting said brake 40 for reverse. The brakes 41 and 42 may be set by shifting the lever 42 to bring the lug 69 in engaging position in the notch 67. When said lever is then shifted to the right it will operate in an obvious manner through the mechanism described to set the brake 41 and when shifted to the left it will operate to set the brake 42. The direction of rotation of the driven member and the various rates of speed of it relative to the driving member may thus be readily controlled through the proper manipulation of the lever 62.

What I claim is:—

1. A transmission mechanism including a driving member, a driven member, a plurality of rotatable drums forming also anchors, a pinion carried by one of said anchors and geared to the driving and to the driven members, pinions carried by the driven member and geared to the other anchors respectively and geared also to the driving member, one of said last mentioned members being formed with a clutch member, a clutch member carried by the driven member and in operative connection therewith, means through which said clutch members may be engaged and released, means for holding the respective anchors against rotation.

2. A transmission mechanism including a driving member, a driven member, a plurality of rotatable drums, forming anchors, a pinion carried by one of said anchors and geared to the driving and to the driven members, pinions carried by the driven member and geared to the other anchors respectively and geared also to the driving member, means through which one of said last mentioned members may be clutched with or released from said driven member, means for holding the respective anchors against rotation, said anchor holding means being releasable to permit the respective anchors to freely rotate.

In testimony whereof I have signed my name to this specification.

NICK G. CEDILLO.